(12) United States Patent
Iwao

(10) Patent No.: US 11,144,762 B2
(45) Date of Patent: Oct. 12, 2021

(54) IMAGE PROCESSING APPARATUS, IMAGE PROCESSING METHOD, AND MEDIUM

(71) Applicant: CANON KABUSHIKI KAISHA, Tokyo (JP)

(72) Inventor: Tomoyori Iwao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 16/232,136

(22) Filed: Dec. 26, 2018

(65) Prior Publication Data
US 2019/0205650 A1 Jul. 4, 2019

(30) Foreign Application Priority Data
Dec. 28, 2017 (JP) .............................. JP2017-254397

(51) Int. Cl.
| | |
|---|---|
| G06K 9/00 | (2006.01) |
| G06K 9/38 | (2006.01) |
| H04N 5/232 | (2006.01) |
| H04N 5/235 | (2006.01) |
| H04N 5/272 | (2006.01) |
| G06T 7/254 | (2017.01) |
| G06T 7/215 | (2017.01) |
| G06K 9/62 | (2006.01) |
| G08B 13/196 | (2006.01) |

(52) U.S. Cl.
CPC ...... *G06K 9/00718* (2013.01); *G06K 9/00711* (2013.01); *G06K 9/38* (2013.01); *G06K 9/6215* (2013.01); *G06T 7/215* (2017.01); *G06T 7/254* (2017.01); *H04N 5/2357* (2013.01); *H04N 5/23218* (2018.08); *H04N 5/272* (2013.01); *G06T 2207/30224* (2013.01); *G06T 2207/30228* (2013.01); *G08B 13/19604* (2013.01)

(58) Field of Classification Search
CPC ................ H04N 5/23218; G06T 7/254; G06K 9/00711; G06K 9/38
See application file for complete search history.

(56) References Cited

U.S. PATENT DOCUMENTS

| | | |
|---|---|---|
| 7,321,724 B2 | 1/2008 | Kito |
| 9,721,383 B1 | 8/2017 | Horowitz et al. |

(Continued)

FOREIGN PATENT DOCUMENTS

| | | |
|---|---|---|
| CN | 103945089 A | 7/2014 |
| CN | 105469604 A | 4/2016 |

(Continued)

OTHER PUBLICATIONS

Extended European search report issued in European Appln. No. 18213989.9 dated May 9, 2019.

*Primary Examiner* — Jeremiah C Hallenbeck-Huber
(74) *Attorney, Agent, or Firm* — Rossi, Kimms & McDowell LLP

(57) ABSTRACT

There is provided with an image processing apparatus. A target image including an object, for a predetermined imaging range, is obtained. A background image, which is obtained from a selected image selected from a captured image for the predetermined imaging range based on brightness of the target image, is obtained. A region of the object in the target image based on the background image is obtained.

15 Claims, 5 Drawing Sheets

(56) References Cited

U.S. PATENT DOCUMENTS

| | | | | |
|---|---|---|---|---|
| 2004/0201729 | A1* | 10/2004 | Poplin | H04N 5/2357 348/226.1 |
| 2006/0261256 | A1* | 11/2006 | Holmes | H04N 5/2351 250/214 SW |
| 2006/0284976 | A1* | 12/2006 | Girgensohn | G06F 16/786 348/135 |
| 2009/0028424 | A1* | 1/2009 | Sato | H04N 5/235 382/162 |
| 2009/0060275 | A1* | 3/2009 | Hamada | G06T 7/174 382/103 |
| 2012/0051631 | A1* | 3/2012 | Nguyen | G06K 9/00201 382/164 |
| 2012/0249802 | A1* | 10/2012 | Taylor | G06T 7/292 348/169 |
| 2013/0113959 | A1* | 5/2013 | Ho | H04N 5/2357 348/226.1 |
| 2015/0207975 | A1* | 7/2015 | Nguyen | H04N 5/2357 348/228.1 |
| 2017/0200277 | A1* | 7/2017 | Keat | G06T 7/248 |
| 2018/0048894 | A1* | 2/2018 | Chen | G06T 5/50 |
| 2018/0174331 | A1* | 6/2018 | Pham | G06T 7/90 |
| 2018/0234603 | A1* | 8/2018 | Moore | H04N 5/332 |

FOREIGN PATENT DOCUMENTS

| | | |
|---|---|---|
| EP | 0671706 A2 | 9/1995 |
| EP | 0986036 A2 | 3/2000 |
| JP | H11069217 A | 3/1999 |
| JP | 2006121275 A | 5/2006 |
| JP | 2007201933 A | 8/2007 |

* cited by examiner

IMAGE PROCESSING APPARATUS, IMAGE PROCESSING METHOD, AND MEDIUM

BACKGROUND OF THE INVENTION

Field of the Invention

This invention relates to an image processing apparatus, an image processing method, and a medium, and more particularly relates to determination of an object region in an image.

Description of the Related Art

Technology for determining an object region in a captured image is widely used in a field of image processing. For instance, in chroma-key compositing technology, an object is captured using a background having a uniform color, and a region having a color other than the uniform color is determined as an object region. Further, in a background difference method, an object region is determined using a difference image between a background image captured in advance or generated from a region on which no moving object is captured, and a target image. The background difference method is described in Japanese Patent Laid-Open No. 2006-121275, for instance.

On the other hand, artificial illumination such as a fluorescent light blinks in accordance with an AC power supply frequency (50 Hz or 60 Hz in Japan) at high speed. Accordingly, it is known that especially in a case where shutter speed of an image capturing apparatus is set to high, brightness of an image captured by the image capturing apparatus largely varies among successive frames, and this is referred to as flicker. As a method for obtaining an image without the flicker, Japanese Patent Laid-Open No. 11-69217 describes a method for changing the shutter speed in a case, where an image capturing apparatus with specific shutter speed ($1/60$ seconds or $1/120$ seconds) detects the flicker, so as to prevent the flicker (e.g., to $1/100$ seconds). Additionally, a method for removing the flicker after capturing by an interpolation process using successively captured frame images is known.

SUMMARY OF THE INVENTION

According to an embodiment of the present invention, an image processing apparatus comprises: a first obtaining unit configured to obtain a target image including an object, for a predetermined imaging range; a second obtaining unit configured to obtain a background image, which is obtained from a selected image selected from a captured image for the predetermined imaging range based on brightness of the target image; and a region determination unit configured to determine a region of the object in the target image based on the background image.

According to another embodiment of the present invention, an image processing method comprises: obtaining a target image including an object, for a predetermined imaging range; obtaining a background image, which is obtained from a selected image selected from a captured image for the predetermined imaging range based on brightness of the target image; and determining a region of the object in the target image based on the background image.

According to still another embodiment of the present invention, a non-transitory computer-readable medium stores a program including instructions which, when the program is executed by a computer, cause the computer to perform: obtaining a target image including an object, for a predetermined imaging range; obtaining a background image, which is obtained from a selected image selected from a captured image for the predetermined imaging range based on brightness of the target image; and determining a region of the object in the target image based on the background image.

Further features of the present invention will become apparent from the following description of exemplary embodiments (with reference to the attached drawings).

DESCRIPTION OF THE EMBODIMENTS

Figure 1:
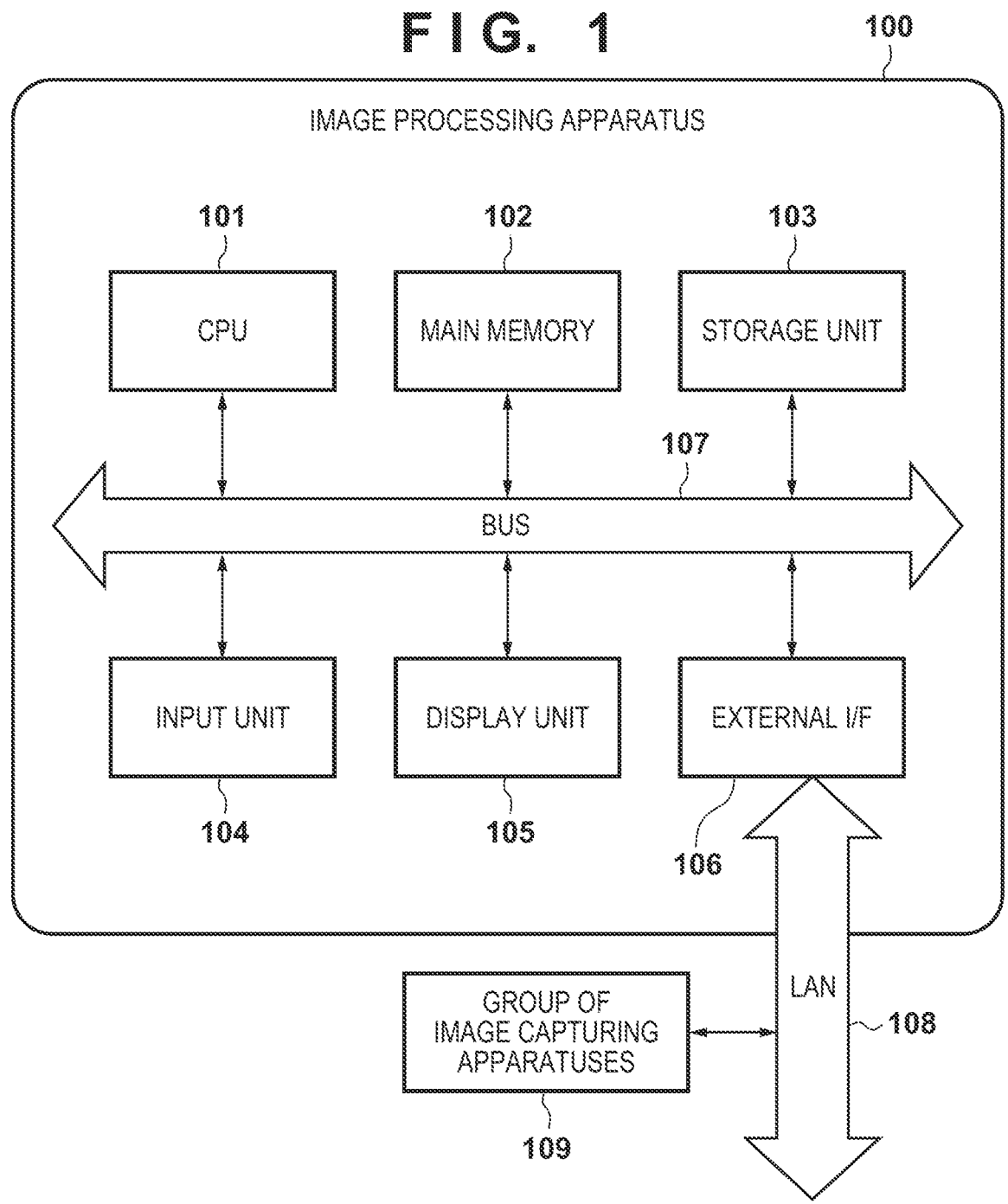
FIG. 1 is a block diagram for illustrating an example of a configuration of an image processing system.

Since brightness of an image varies in a case where flicker occurs, the method for determining an object region in a captured image based on colors in Japanese Patent Laid-Open No. 2006-121275 is not capable of accurately determining an object region. Although it is possible to remove the flicker by interpolation, in this case, blur occurs for an object, and thus determination accuracy of the object region lowers. On the other hand, the method described in Japanese Patent Laid-Open No. 11-69217 uses shutter speed adjusted to blinking speed of an illumination apparatus to avoid flicker, and thus arbitrary shutter speeds, especially higher shutter speeds were not usable.

An embodiment of the present invention makes it possible to determine the object region with high accuracy even in a case where brightness of a captured image varies due to flicker or the like.

Hereinafter, embodiments of the present invention will be described by referring to the drawings. Note that, the following embodiments do not limit the present invention, and all combinations of characteristics described in the present embodiment are not necessarily essential for resolution measures in the present invention. Note that, identical configurations will be described with identical numerals.

Embodiment 1

In Embodiment 1, a case where brightness variation in a movie occurs due to flicker of an illumination apparatus will be described. The brightness variation due to the flicker of the illumination apparatus refers to periodical variation to a certain extent that occurs in a movie due to a difference between a frame rate for movie capturing and a flicker cycle of the illumination apparatus. The brightness variation in the movie is also referred to as luminance variation in some cases.

FIG. 1 illustrates an example of an image processing system for determining an object region according to Embodiment 1. This image processing system is capable of performing object extraction processing for determining an object region being a region that an object captured in an image occupies in the image. The image processing system illustrated in FIG. 1 includes an image processing apparatus 100 and a group of image capturing apparatuses 109 such as one or more cameras. In Embodiment 1, an example in which object region determination is performed for an image obtained by one image capturing apparatus among the group of image capturing apparatuses 109 will be described.

The image processing apparatus 100 includes a CPU 101, a main memory 102, a storage unit 103, an input unit 104, a display unit 105, and an external I/F 106. Each of the above units is connected with each other via a bus 107 for data transfer. The CPU 101 is an arithmetic processing unit (processor) for performing overall control of the image processing apparatus 100, and is capable of performing various processes by executing various programs stored in the storage unit 103 and the like. The main memory 102 is capable of temporarily storing data, parameters or the like used for various processes, and is a storing medium capable of providing a work area for the CPU 101. The main memory 102 may be a volatile memory such as a RAM, for instance. The storage unit 103 is a storage medium capable of storing various data necessary for various programs or for displaying a Graphical User Interface (GUI). The storage unit 103 may be, for instance, a mass storage device, or a non-volatile memory such as a hard disk or a silicon disk.

The input unit 104 is a device for accepting an operation input from a user. The input unit 104 may be an input device such as a keyboard, a mouse, an electronic pen, or a touch panel. The display unit 105 is a device for displaying a processing result, an image, a GUI, or the like, and may be an output device such as a liquid crystal panel, for instance. Further, the display unit 105 is capable of displaying a processing result, such as a determination result of an object region or a separation result of an object and a background. The external I/F 106 is an interface for the image processing apparatus 100 to transmit/receive data with an external apparatus. In the present embodiment, the external I/F 106 is connected via a LAN 108 with each image capturing apparatus consisting the group of image capturing apparatuses 109. The image processing apparatus 100 can transmit/receive data such as image data or control signal data with each image capturing apparatus via the external I/F 106. The group of image capturing apparatuses 109 includes one or more image capturing apparatuses. Each of the image capturing apparatuses, according to the control signal data received from the image processing apparatus 100, is able to start or stop capturing an image, to change capturing parameters (shutter speed, an aperture, or the like), to transfer image data obtained by capturing an image, and the like. Note that, the image processing system may include various components other than the above described components, but descriptions thereof will be omitted.

Figure 2:
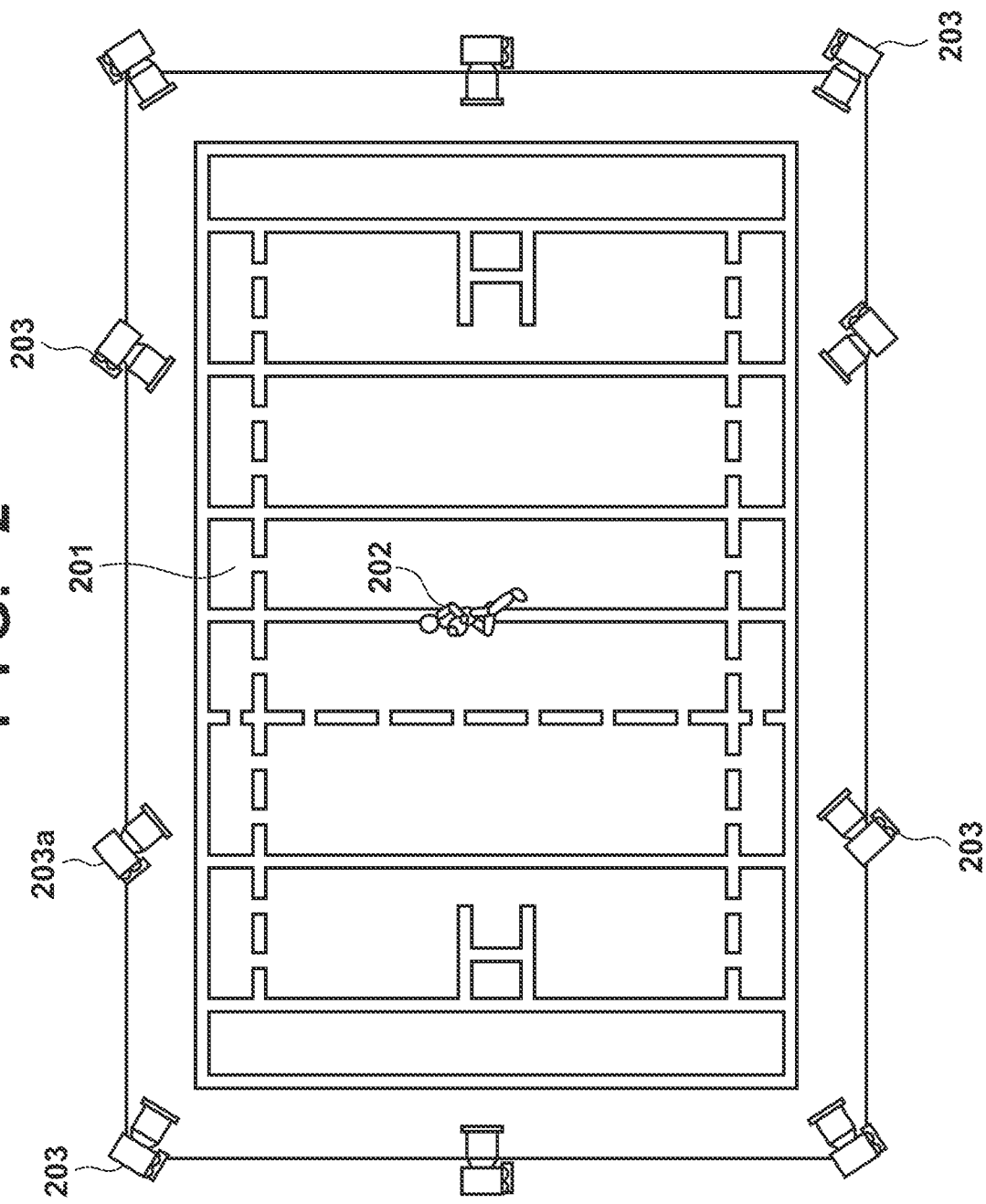
FIG. 2 is a diagram for illustrating an arrangement example of an image capturing apparatus.

FIG. 2 illustrates an arrangement example of each image capturing apparatus included in the group of image capturing apparatuses 109. It is possible to determine object regions of images captured in various scenes such as sports and entertainment. In FIG. 2, as an example, a case where ten image capturing apparatuses are installed in an indoor stadium is described. Certainly, also in a case where image capturing is performed in an outdoor stadium, and an illumination apparatus exists, flicker may occur in a captured image, and thus the image processing system according to the present embodiment is applicable.

In FIG. 2, a player and a ball being an object 202 exist on a field 201 on which a game is played. The object 202 is a moving object, and a location thereof changes on a movie captured by an identical image capturing apparatus. In FIG. 2, the ten image capturing apparatuses 203 are arranged to surround the field 201. For individual image capturing apparatus 203 included in the group of image capturing apparatuses 109, a direction of the image capturing apparatus, a focal distance, an exposure control parameter, or the like, is set such that the whole field 201, or a target region on the field 201 fits in a field angle. Note that, the number of the image capturing apparatuses 203 is not limited to ten, and may be less than ten or more than ten.

Figure 3:
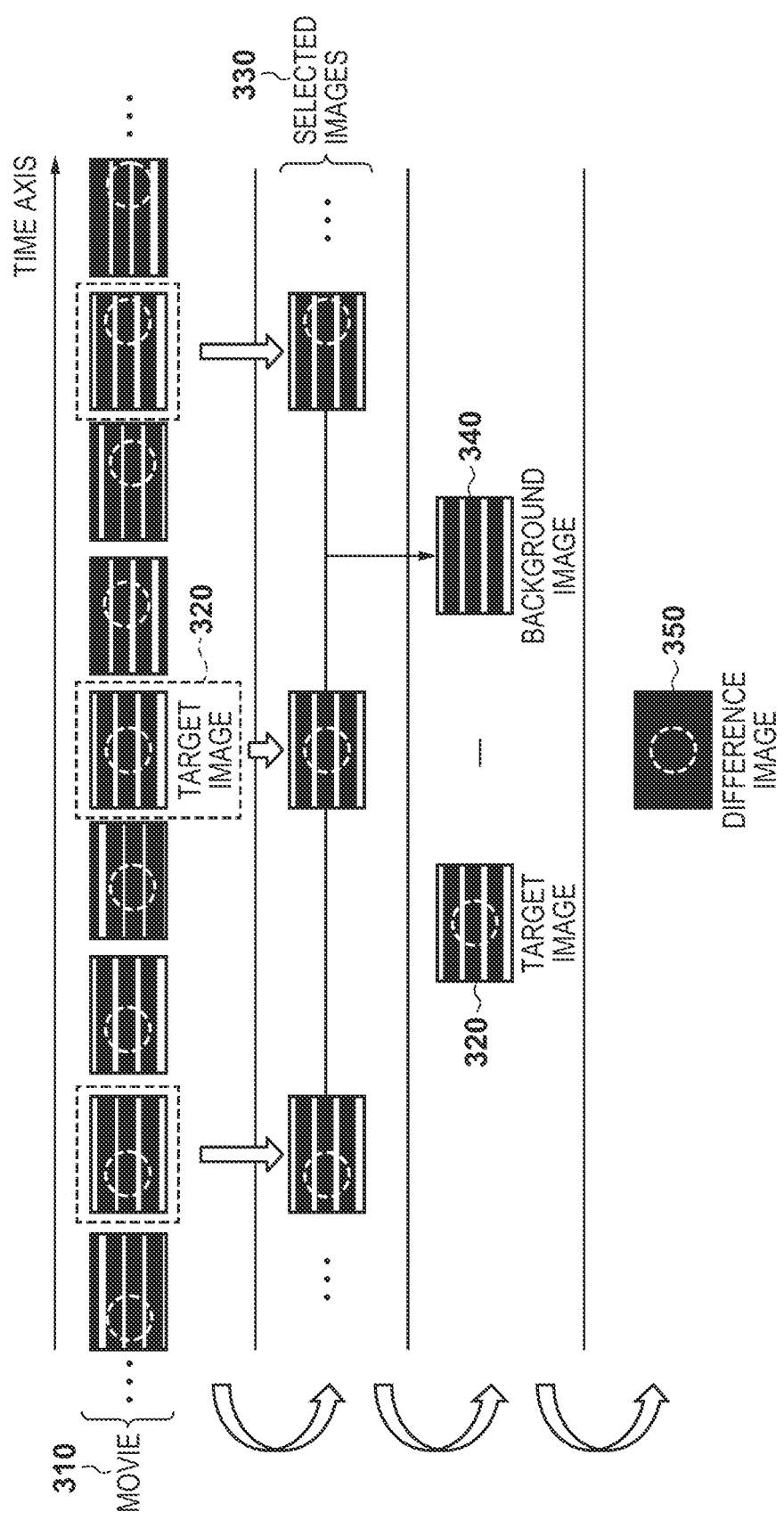
FIG. 3 is a diagram for explaining an image processing method according to an embodiment.

FIG. 3 is a conceptual view for explaining processing according to the present embodiment. In FIG. 3, a movie 310 obtained by an image capturing apparatus 203a is illustrated. The movie 310 is obtained by capturing a predetermined imaging range including the object 202 by the image capturing apparatus 203a, and includes a plurality of frame images. The movie 310 includes a target image 320 as one of the plurality of frame images. A case where an object region is determined for the target image 320 will be described below. However, the image processing apparatus 100 according to the present embodiment may perform the following processes for any target image including a still image.

First, from a frame image having similar brightness to the target image 320 and included in the movie 310, a background image 340 is obtained. In the present embodiment, firstly, the frame images having similar brightness to the target image 320 are selected as selected images 330 for background generation. In this case, it is possible to determine a brightness variation cycle in the movie 310 (e.g., a flicker cycle), and depending on the variation cycle, to select an image as the selected images 330. Thus, a plurality of frame images are selected as the selected images 330 in the example below. Instead, a single frame image may be selected as the selected images 330 in another example. Next, from the selected images 330, it is possible to generate the background image 340. Lastly, an object region is determined based on the target image 320 and the background image 340. In the present embodiment, a region with a larger difference between the target image 320 and the background image 340 than a threshold value, for example, a region with a pixel value difference larger than a threshold value is determined as an object region.

Figure 4:
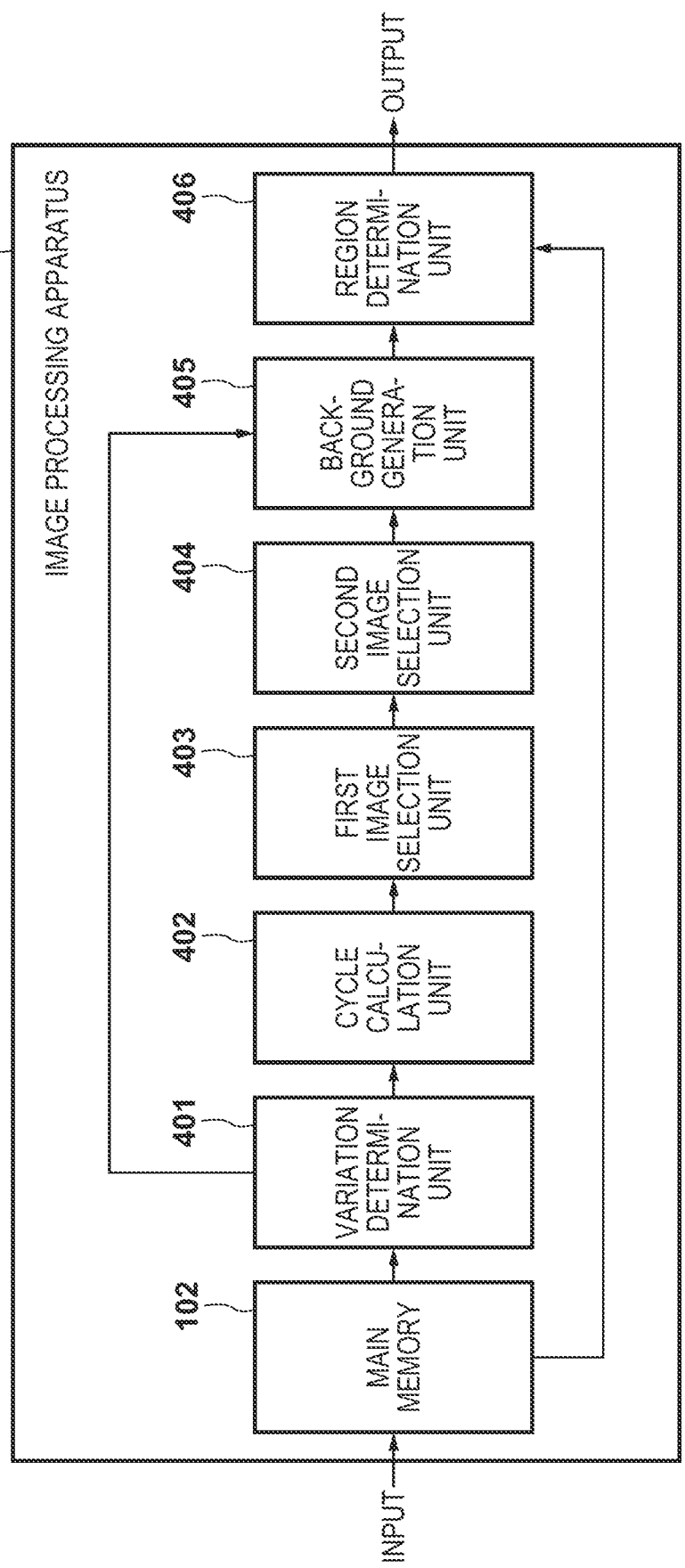
FIG. 4 is a block diagram for illustrating an example of a logical configuration of an image processing apparatus.

FIG. 4 is a block diagram illustrating a functional configuration of the image processing apparatus 100 according to the present embodiment. The image processing apparatus 100 includes a variation determination unit 401, a cycle calculation unit 402, a first image selection unit 403, a second image selection unit 404, a background generation unit 405, and a region determination unit 406.

The variation determination unit 401 obtains the target image 320 for a predetermined imaging range, including the object 202 (a first obtainment). In the present embodiment, the variation determination unit 401 obtains the movie 310 previously captured by the image capturing apparatus 203a from the main memory 102. Additionally, the variation determination unit 401 determines whether the brightness variation occurs in the movie 310 or not. For instance, the variation determination unit 401 may determine whether a brightness variation amount in a time direction of the movie 310 exceeds a threshold value or not, and in a case where the variation amount exceeds the threshold value, can determine that the brightness variation occurs. A determination method for the brightness variation will be described in detail later (step S501). Note that, in the Specification, the time direction refers to a capturing sequence direction or a frame number direction of frame images included in the movie 310. For instance, a group of successive frame images in the time direction refers to a frame image group captured in succession.

The cycle calculation unit 402 calculates the brightness variation cycle in the movie 310. This process may be performed in a case where the brightness variation is determined to occur in the movie 310. As described above, the brightness variation may occur in the movie 310. For instance, brightness of the movie 310 may periodically vary at a predetermined cycle. Further, the movie 310 may contain the flicker, and the brightness of the movie 310 may periodically vary at a predetermined cycle due to the flicker. The cycle calculation unit 402 may calculate this predetermined cycle. A calculation method for a variation cycle will be described in detail later (step S503). Note that, the brightness of the movie 310 need not vary strictly at a constant cycle, and a variation cycle may vary to a certain extent.

The first image selection unit 403 and the second image selection unit 404, according to brightness of the target image 320, select an image as the selected images 330 from a captured image for a predetermined imaging range. For instance, it is possible to select the selected images 330 from a captured image captured by the image capturing apparatus 203a that has captured the target image 320. In the present embodiment, the first image selection unit 403 and the second image selection unit 404, according to the brightness of the target image 320, select the selected images 330 from a plurality of frame images included in the movie 310. The selected image selected as described above is used as an image for background generation for generating the background image 340.

In the present embodiment, according to a brightness variation cycle of the movie 310, as the selected images 330, the frame image having similar brightness to the target image 320 is selected from the frame image included in the movie 310. For instance, the first image selection unit 403, according to the cycle calculated by the cycle calculation unit 402, selects a plurality of frame images as candidate images from the movie 310. The second image selection unit 404, selects an image according to the brightness of the target image 320, as the selected images 330, from the candidate images selected by the first image selection unit 403. A selection method for the selected images 330 will be described later (step S504).

The background generation unit 405 obtains the background image 340 that can be obtained from the selected images 330 selected from the captured image for the predetermined imaging range according to the brightness of the target image 320. In the present embodiment, the background generation unit 405 generates the background image 340 by using the selected images 330 selected by the second image selection unit 404. As described above, in the present embodiment, the background generation unit 405 obtains the background image 340, by using the cycle calculation unit 402, the first image selection unit 403, and the second image selection unit 404 (a second obtainment). A generation method for the background image 340 will be described in detail later (steps S506, S507). On the other hand, the background generation unit 405 may also obtain a background image that can be obtained from selected images selected from a plurality of frame images included in the movie 310, irrespective of the brightness of the target image target image 320 (a third obtainment, step S502).

The region determination unit 406, based on the background image 340, determines a region of the object 202 in the target image 320. In the present embodiment, the region determination unit 406, depending on whether a brightness variation amount in the time direction of the movie 310 exceeds a threshold value or not, switches processing. For instance, the region determination unit 406, according to a fact that the variation amount exceeds the threshold value, determines a region of the object 202, by using the background image 340 obtained from the selected images 330 selected from captured images for a predetermined imaging range, according to the brightness of the target image 320. On the other hand, the region determination unit 406, according to a fact that the variation amount does not exceed the threshold value, determines a region of the object 202 by using a background image obtained from selected images, which is selected from a plurality of frame images included in the movie 310 irrelevant of the brightness of the target image 320. A region determination method will be described in detail later (step S508).

Figure 5:
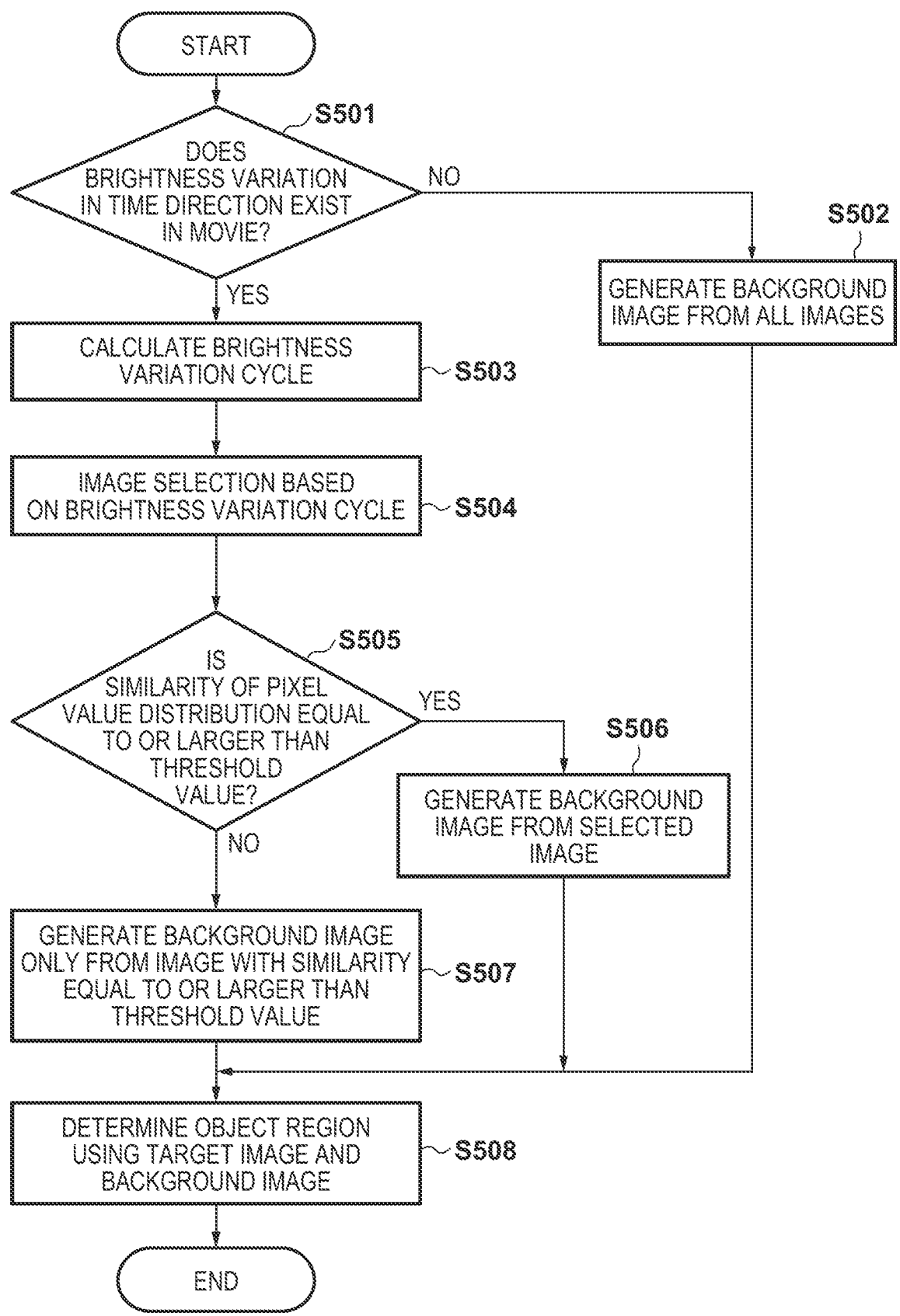
FIG. 5 is a flowchart for illustrating an example of processing performed by the image processing apparatus.

Next, processing to be performed by the image processing apparatus 100 will be described with reference to a flowchart illustrated in FIG. 5. The CPU 101 achieves this series of processes by reading a program from the storage unit 103, expanding the program in the main memory 102, and executing the program. This program includes instructions for achieving a function for each unit illustrated in FIG. 4 or the like, and achieving the processing according to the flowchart illustrated in FIG. 5. Note that, all processes described below need not be executed by the CPU 101. For instance, some or all of the processes may be executed by one or a plurality of processing circuits other than the CPU 101.

In the step S501, the variation determination unit 401 determines whether temporal brightness variation exists in the movie 310 expanded in the main memory 102 or not. For instance, the variation determination unit 401 may calculate a magnitude of the temporal brightness variation, for all regions or a partial region of the movie 310, and in a case where the magnitude of the variation exceeds a threshold value, may determine that the temporal brightness variation exists in the movie 310.

The variation determination unit 401 may perform this determination, by using a feature amount reflecting brightness of a frame image. This feature amount is not limited specifically, but may be a value calculated using a pixel value of a frame image, for instance. As a specific example, the feature amount may be an average value of pixel values or an average value of brightness values of the frame images. This feature amount may be expressed as a vector or a matrix, for instance, may be an average value of pixel values for each color channel, or may be a histogram of pixel values. Further, the feature amount may be pixel value distribution in a frame image, or spatial frequency distribution in a frame image. For instance, it is possible to express the pixel value distribution in a frame image by the number of pixels included in each bin corresponding to a specific pixel value range. Additionally, it is possible to express the spatial frequency distribution in a frame image by intensity of each spatial frequency component, for instance. Further, the variation determination unit 401 may determine whether the temporal brightness variation for a specific region in a frame image exists or not. In this case, the feature amount reflecting the brightness of the frame image may be a value calculated using a pixel value in this specific region.

Hereinafter, an example in which whether the temporal brightness variation exists in the movie 310 or not is determined using an average pixel value in a partial region of the movie 310 will be described. Note that, a determination method for the temporal brightness variation described below is a mere example, and is not limited to the following method. For instance, in a case where, for each frame image, a change in a feature amount from each of a predetermined number of frame images that exist forward and backward exceeds a threshold value, it is possible to determine that the brightness variation exists in the movie 310 around this frame image. Additionally, as another method, in a case where a difference between a maximum value and a minimum value of a feature amount of each frame image included in the movie 310 exceeds a threshold value, it is also possible to determine that the brightness variation exists in the movie 310.

Hereinafter, the number of frame images included in the movie 310 is M. Further, the number of pixels in a width direction of the movie is IV, and the number of pixels in a height direction of the movie is H. Additionally, a pixel value of a pixel (x,y) is It(x,y), in a t-th frame image. First, n square patches P each having a constant size are arranged on an image. A distribution layout of the patches P is arbitrary, and, for instance, the patches P may be arranged at even intervals. Then, an average pixel value μ for M frame images included in the movie 310 is obtained by dividing a total value of pixel values by the number of pixels as in Formula (1). Further, it is possible to define the degree of variation as a magnitude of a difference between a pixel value of each pixel and the average pixel value μ. In the present embodiment, it is possible to express the degree of variation D for one frame image as in Formula (2). In Formula (2), the degree of variation D is defined as a total value of respective difference magnitudes between pixel values of pixels and the average pixel value μ, for all pixels included in any one of all the patches P.

$$\mu = \frac{\sum_{t=1}^{M}\sum_{y=1}^{H}\sum_{x=1}^{W} I_t(x, y)}{M \times W \times H} \quad (1)$$

$$D = \sum_{i=0}^{n}\sum_{x,y} \|\mu - P_i(x, y)\| (x, y \text{ in } P) \quad (2)$$

In a case where the degree of variation D calculated as described above exceeds a preset threshold value, the variation determination unit 401 determines that the brightness variation exists in the movie 310. In an embodiment, the variation determination unit 401, in a case where the degree of variation D is below a threshold value for all the frame images included in the movie 310, determines that the brightness variation does not exist in the movie 310, and otherwise, determines that the brightness variation exists in the movie 310. A setting method for the threshold value is arbitrary, and the threshold value may be set based on an amount of capturing noise constantly generated during image capturing of the movie 310, the number or sizes of moving objects existing in a scene in which the movie 310 is captured, or the like, for instance. In another embodiment, it is possible to calculate the degree of variation for each patch. In this case, the number of patches for which the degree of variation exceeds the threshold value may be used as the brightness variation amount. For instance, in a case where, the number of the patches for which the degree of variations exceeds the threshold value exceeds a predetermined threshold value, it is possible to determine that the brightness variation exists in the movie 310 including this frame image.

In a case where the temporal brightness variation is determined not to exist in the movie 310, the processing advances to the step S502. In a case where the temporal brightness variation is determined to exist in the movie 310, the processing advances to the step S503.

In the step S502, the background generation unit 405 generates the background image 340 for the movie 310. A method for generating the background image 340 from the movie 310 is not limited specifically. Here, the background generation unit 405 may obtain a background image that can be obtained from selected images, which is selected from a plurality of frame images included in the movie 310 irrelevant of the brightness of the target image 320. For instance, the background generation unit 405 may select all the frame images included in the movie 310 as selected images. Additionally, the background generation unit 405 may select a frame image group including the target image 320 and being successive in the time direction as selected images. In addition, the background generation unit 405 may generate the background image 340 by using the selected images. For instance, as illustrated in Formula (3), it is possible to generate the background image 340 by using an intermediate value filter (med). In Formula (3), B(x,y) refers to a pixel value of a pixel (x,y) in the background image 340, and this is an intermediate value of a pixel value It(x,y) for each frame image. Using the intermediate value filter makes it possible to calculate an intermediate value in the time direction of the pixel value for each pixel. Accordingly, even in a case where an object is moving in the movie 310, it is possible to generate the background image 340 on which the object is not exist. As a method for generating the background image 340, another known method is also usable.

$$B(x,y)=\text{med}(I_t(x,y)) \quad (3)$$

In the step S503, the cycle calculation unit 402 calculates a brightness variation cycle of the movie 310. A method for calculating the variation cycle is not limited specifically, but for instance, the cycle calculation unit 402 may determine the variation cycle based on the feature amount reflecting the brightness of the frame image described above. In the following, a case where a variation cycle is calculated using change in pixel value distribution of a frame image will be described.

First, the cycle calculation unit 402 generates, for a frame image m of an m-th frame, a histogram of pixel values for the whole image. In the present embodiment, the cycle calculation unit 402, for k bins each corresponding to a predetermined pixel value range, by counting the number of pixels each having a pixel value corresponding to the bin, calculates a frequency of each bin. As described above, the cycle calculation unit 402 may generate the histogram. Additionally, in a case where a frame image has a plurality of channels (e.g., R, G, and B), the cycle calculation unit 402 generates a histogram for each channel. Accordingly, for the frame image m, a k-by-1 matrix Am storing frequencies of the histogram and including rows corresponding to the number of bins k and columns corresponding to the number of channels (1), is obtained.

Additionally, the cycle calculation unit 402 calculates similarity S of the histogram of each of frame images of respective L frames before and after the m-th frame with respect to the histogram of the frame image m. For instance, the cycle calculation unit 402 may calculate, for each of 2L frame images from an m−L-th to an m+L-th (excluding the frame image m), the similarity S with respect to the frame image m according to Formula (4). In Formula (4), Ai denotes a histogram matrix of an i-th (m−L≤i≤m+L) frame image, and sum(Am-Ai) denotes a total value of elements of the matrix (Am-Ai). According to Formula (4), for each bin of the histogram, a difference value of frequencies is calculated, and the lower the accumulated difference value, the higher the determined similarity is.

$$S_{m,i} = \frac{1}{\text{sum}(A_m - A_i) + 1} (m - L \leq i \leq m + L) \quad (4)$$

The cycle calculation unit 402 determines, for the 2L frame images, a frame image having maximum similarity Sm,i. Here, we assume that the determined frame image has the similarity of Smax. Next, the cycle calculation unit 402 determines a threshold value αSmax (0≤α≤1), based on the maximum similarity Smax. The cycle calculation unit 402, by gradually decreasing α from 1, may adjust the threshold value α such that frame images having the similarity S equal to or larger than the threshold value αSmax are detected at substantially even intervals. Additionally, in this case, an interval between frame images having the similarity S equal to or larger than the threshold value αSmax (e.g., the number of frames or a time interval) is determined as a brightness variation cycle. A method for determining the cycle is not limited to this method, and, for example, the threshold value α may be preset. Additionally, only some bins of the bins of the histogram may be used to determine the similarity. Further, another method can include detecting frame images such that the similarity S between the frame images is within a preset range, and determining the brightness variation cycle based on the number of the detected frame images or intervals.

A method for calculating the similarity S is not limited to the above-described method. For instance, there is a method for calculating similarity from variance and a mean value of a histogram. As a specific example, there is a method for calculating the similarity S after adjusting each element of the matrix (Am-Ai) by using variance of frequencies of a corresponding bin. Additionally, there is also a method including obtaining the number of bins for which a difference between frequencies is equal to or less than a threshold value, and for calculating similarity based on the number.

Further, it is not necessary that a brightness variation cycle is calculated by using a histogram of pixel values. For instance, it is possible to calculate a cycle based on differences between pixel values of a whole image. As a specific example, it is possible to obtain similarity based on a difference between representative pixel values (e.g., average values of pixel values of respective pixels) of a frame image, and determine a cycle based on this similarity, similarly to when a histogram is used.

As another example, the cycle calculation unit 402 may also calculate a brightness variation cycle by performing frequency analysis on a feature amount reflecting brightness of a frame image in the time direction. For instance, the cycle calculation unit 402 may calculate a variation cycle by plotting pixel value distribution of a whole image in the time direction, and applying Fourier transformation.

Further, calculation of a brightness variation cycle need not be performed in consideration of all pixels of a frame image. That is, calculation of a cycle may be performed based on part of pixels. For instance, one or more patches each having a constant size may be arranged on a movie, and then a similar process may be performed based on pixels in the patch region. Additionally, a patch with larger brightness variation may be selected among the plurality of patches, and a cycle may be calculated based on pixels contained in this patch. Since an effect of noise is relatively small for a patch with larger brightness variation, it is possible to calculate the variation cycle with higher accuracy according to this method.

In the step S504, the first image selection unit 403, based on the brightness variation cycle calculated in the step S503, selects a frame image as a candidate image. Here, the first image selection unit 403 may select, as a candidate image, a frame image which is away from the target image 320 in the time direction by a multiple of the brightness variation cycle. As an example, in a case where the target image is the frame image m of the m-th frame, and the brightness variation cycle is T [frames], the first image selection unit 403 may select an (m+jT)-th frame image. Here, when a total number of the frame images is M, 1≤m+jT≤M (j is an integer) holds.

On the other hand, a flicker cycle, due to deterioration of an illumination apparatus itself or influence by interference of a plurality of illumination apparatuses, may vary and thus is not always constant. Thus, the first image selection unit 403 may further select a frame image group around the (m+jT)-th frame image as candidate images. For instance, the first image selection unit 403 may select from (m+jT K)-th to (m+jT+K)-th frame images that are continuous with the (m+jT)-th frame image in the time direction as candidate images. Hereinafter, these frame images are collectively referred to as an (m+jT)-th frame image group. Certainly, in a case where the similarity S of each of frame images obtained at a constant cycle is high, further frame image selection need not be performed. That is, a value of K is arbitrary, and may be 0, may be 1, or may be 2 or more. According to the above configuration, it is possible to determine an object region with high accuracy even in a case where a plurality of illumination apparatuses exists or when a brightness variation cycle varies for a reason of deterioration of an illumination apparatus over time, or the like.

In the step S505, the second image selection unit 404 selects a frame image group having the similarity S to the frame image m equal to or larger than the threshold value, from the frame image groups selected by the first image selection unit 403. For instance, in a case where a frame image group includes a frame image having the similarity S to the frame image m equal to or larger than the threshold value, the second image selection unit 404 may select this frame image group. The threshold value used in this case is arbitrary, but for instance, αSmax used in the step S503 may be used. Further, the second image selection unit 404, in a case where the number of selected frame image groups is larger than a predetermined number, or in a case where the number of selected frame image groups is smaller than a predetermined number, may raise the threshold value or lowering the threshold value. Certainly, in a case where only frame images each having the similarity smaller than the threshold value exist in the frame image group, this frame image group need not be selected. In a case where the similarity S is determined to be equal to or larger than the threshold value for all the frame image groups, the processing advances to the step S506. Otherwise, the processing advances to the step S507.

With the processing in the step S505, the second image selection unit 404 may select the selected images 330 based on the similarity with the feature amount reflecting the brightness of the target image 320. For instance, the second image selection unit 404 may select an image for which the similarity of the feature amount reflecting the brightness of the target image 320 is equal to or larger than the threshold value, as the selected images 330. On the other hand, the second image selection unit 404 does not select a frame image without brightness similar to the target image 320, even when the frame image is near the target image 320 in the time direction. Accordingly, the second image selection unit 404 may select a first frame image and a second frame image being distant in the time direction, from a plurality of frame images included in the movie 310, as selected images. In this case, the movie 310 may include one or more unselected frame images between the first frame image and the second frame image. However, two or more successive frame images may be selected as selected images as long as the images have similar brightness to the target image 320.

In the step S506, the second image selection unit 404 selects a frame image with the highest similarity S to the frame image m, for each frame image group as the selected images 330. Additionally, in the second image selection unit 404, the background generation unit 405 generates the background image 340 from the selected images 330. As a method for generating the background image 340, a method similar to the method in the step S502 is usable. For instance, the second image selection unit 404 may generate the background image 340 by processing the selected images 330 with an intermediate value filter.

In the step S507, the second image selection unit 404 selects a frame image with the highest similarity S to the frame image m, for the frame image groups selected in the step S505, as the selected images 330. Additionally, in the second image selection unit 404, the background generation unit 405 generates the background image 340 from the selected images 330. As a method for generating the background image 340, a method similar to the method in the step S502 is usable. For instance, the second image selection unit 404 may generate the background image 340 by processing the selected images 330 with an intermediate value filter.

In the step S508, the region determination unit 406 determines an object region by using the target image 320 and the background image 340 generated by the background generation unit 405. A method for determining the object region is not limited specifically, but, for example, the region determination unit 406 may determine a region of the object 202, by generating a difference image 350 between the target image 320 and the background image 340. As a specific example, the region determination unit 406 may obtain a difference between respective pixel values of the target image 320 and the background image 340 for each pixel, to determine a region with the difference equal to or larger than the threshold value to be a region of the object 202.

Hereinbefore, the processing for determining the region of the object 202 in the target image 320 was described with reference to the flowchart in FIG. 5. In an embodiment, a region of the object 202 is determined also for another frame image included in the movie 310. In this case, the processing illustrated in FIG. 5 is repeatable, while another frame image is used as a target image. In this case, the processing in the steps S501 and the S503 may be omitted. That is, in a case where the brightness variation is determined to exist in the movie 310 in advance, it is possible to select as selected images according to the variation cycle previously calculated, and generate a background image. Further, in a case where the brightness variation is determined not to exist in the movie 310 in advance, it is possible to generate a background image in accordance with the step S502.

In the above description, in the step S501, whether the brightness variation exists in the movie 310 or not was determined by referring to all the frame images included in the movie 310. On the other hand, the variation determination unit 401 may determine whether the brightness variation exists in the movie 310 around the target image 320, and the cycle calculation unit 402 may calculate a brightness variation cycle around the target image 320. For instance, the variation determination unit 401 may determine whether the brightness variation exists or not by referring to a predetermined number of frame images continuous with the target image 320 in the time direction. Further, the cycle calculation unit 402 may calculate a brightness variation cycle by using a predetermined number of frame images continuous with the target image 320 in the time direction. In this case, it is possible to perform the processing in the steps S501 and S503, for each frame image included in the movie 310. According to the above configuration, even in a case where the brightness variation cycle varies during image capturing, it is possible to determine an object region with high accuracy.

Further, in the above description, the selected images were selected from all the frame images included in the movie 310. On the other hand, selected images may be selected from around the target image 320. For instance, it is possible to select as a selected image according to the brightness of the target image 320, from a predetermined number of frame images continuous with the target image 320 in the time direction. According to the above configuration, even in a case where a background of the movie 310 gradually changes, it is possible to determine an object region with high accuracy. As a specific example, in the step S504, the first image selection unit 404 may select a candidate image based on the brightness variation cycle, from a predetermined number of frame images continuous with the target image 320 in the time direction. This configuration may be used in combination with a configuration for determining whether the brightness variation exists or not by referring to the predetermined number of frame images continuous with the target image 320 in the time direction. Here, the predetermined number of frame images from which the candidate image is selected, and the predetermined number of frame images to be used to determine whether the brightness variation exists or not may be identical to each other.

According to the present embodiment, even in a case where brightness variation occurs in a movie, it is possible to enhance determination accuracy of an object region by generating a background image from an image with similar brightness to a target image. Especially, according to the present embodiment, even in a case where shutter speed possibly generating flicker, faster than the shutter speed in the technique described in Japanese Patent Laid-Open No. 2006-121275 is used, it is possible to determine an object region with high accuracy. Thus, according to the present embodiment, even in a case where shutter speed is set to be faster to reduce motion blur in a scene such as sports photographing, in which an object moves at high speed, it is possible to determine an object region with higher accuracy. Further, according to the technique in the present embodiment, since a frame rate need not be changed during image capturing to reduce flicker, it is possible to continue capturing a movie even when the flicker is detected.

OTHER EMBODIMENTS

To improve determination accuracy of an object region, it is not essential to use all configurations included in the image processing apparatus 100 according to Embodiment 1, and processes performed by the image processing apparatus 100. In the image processing apparatus 100 according to an embodiment, the variation determination unit 401 obtains the target image 320 for a predetermined imaging range including the object 202, but does not determine brightness variation in a movie. In this case, independently of whether the brightness variation exists in the movie or not, it is possible to perform the processing in the steps S503 to S507.

Additionally, in an embodiment, the image capturing apparatus 203a captures a plurality of images for a predetermined imaging range as background images, and the respective captured images differ in brightness from each other due to flicker. In such an embodiment, the background generation unit 405 may select an image according to the brightness of the target image 320, from the background image captured by the image capturing apparatus 203a, and using this as the background image 340. This background image may be contained, or may not be contained in the movie 310. In this embodiment, it is possible to omit the cycle calculation unit 402, the first image selection unit 403, and the second image selection unit 404.

In a further embodiment, it is possible to store a background image generated by the background generation unit 405 according to brightness of a frame image, in a storage media such as the main memory 102. Additionally, the background generation unit 405, in a case where the background image obtained from the selected images selected according to the brightness of the target image 320 is stored in the main memory 102, may select this image to use as the background image 340. As an example, the background generation unit 405 may obtain a background image obtained from selected images for which similarity of a feature amount reflecting brightness with the target image 320 is equal to or larger than a threshold value, from the main memory 102. Additionally, the background generation unit 405 may obtain from the main memory 102 a background image generated for a frame image with similarity of a feature amount reflecting brightness with the target image 320 equal to or larger than a threshold value.

In Embodiment 1, the cycle calculation unit 402, the first image selection unit 403, and the second image selection unit 404, based on the brightness variation cycle of the movie 310, select as the selected images 330 according to the brightness of the target image 320. Here, selecting as the selected images 330 based on the brightness variation cycle of the movie 310 is not essential, and calculating the brightness variation cycle of the movie 310 is also not essential. For instance, the second image selection unit 404, according to the brightness of the target image 320, may select as selected images from captured images for a predetermined imaging range. In an embodiment, the second image selection unit 404 may select an image for which similarity of a feature amount reflecting brightness with the target image 320 is equal to or larger than a threshold value as the selected images 330. As an example, it is possible to select an image as the selected images 330, according to a value based only on a difference in pixel value distribution between images, such as the above-described similarity S. The selected images selected by the second image selection unit 404 may be included in the movie 310, or may be a captured image which is captured by the image capturing apparatus 203a and which is not included in the movie 310. In the above embodiment, it is possible to omit the cycle calculation unit 402 and the first image selection unit 403.

In Embodiment 1, the case where the brightness of the movie 310 varies mainly due to the flicker was described. However, also for a case where a background of the movie 310 periodically changes due to blink of an illumination apparatus or the like, the method in Embodiment 1 is applicable.

In Embodiment 1, the processing in which a single viewpoint movie 310 captured by the single image capturing apparatus 203a is used to calculate the brightness variation cycle, and determine the object region based on this cycle was described. However, it is also possible to determine an object region by referring to a movie from other viewpoints. For instance, in a case where a plurality of image capturing apparatuses is installed, as illustrated in FIG. 2, it is possible to consider a movie obtained in another image capturing apparatus. For instance, the variation determination unit 401 may obtain a movie of the object 202 captured by each of a plurality of the image capturing apparatuses 203, and calculating a brightness variation cycle for each movie. In this case, it is possible to compare the variation cycles among the plurality of image capturing apparatuses 203.

For instance, it is possible to verify a determination result of a variation cycle for a movie captured by a first image capturing apparatus, by using a determination result of a variation cycle for a movie captured by a second image capturing apparatus. As a specific example, in a case where a variation cycle significantly different from other image capturing apparatuses is calculated, the cycle calculation unit 402 may remove this variation cycle. In this case, the cycle calculation unit 402 may determine that the calculated cycle is an error, and, for instance, may calculate another variation cycle with a method such as adjusting the above-described threshold value $\alpha$. Since image capturing apparatuses arranged physically adjacent to each other are susceptible to influence of an identical illumination apparatus, in order to improve verification accuracy, variation cycles may be compared among the image capturing apparatuses arranged physically adjacent to each other (e.g., arranged within a predetermined distance) in this embodiment.

It is possible to use the above-described embodiment to estimate a three-dimensional location and shape of the object 202. For instance, the variation determination unit 401 may obtain an image including the object 202 captured by each of the plurality of image capturing apparatuses 203. This image is an image obtained by simultaneously capturing the object 202. The background generation unit 405, with the above-described method, may obtain a background image for each of images captured by the plurality of image capturing apparatuses 203. Additionally, the region determination unit 406 may determine a region of the object 202, in each of the images captured by the plurality of image capturing apparatuses 203. Further, an estimation unit (not illustrated) included in the image processing apparatus 100 may estimate a three-dimensional location and shape of the object 202, based on a region of the object 202 determined in each of the images captured by the plurality of image capturing apparatuses 203. As an estimation method for the location and the shape, a known method is adoptable such as a view volume intersection method, and thus description thereof is omitted. According to the above-described embodiments, although the image obtained by the image capturing apparatus 203 contains the flicker, it is possible to determine the region of the object 202 with high accuracy, and thus estimate the location and the shape of the object 202 with high accuracy.

Further, by using the three-dimensional location and shape of the object 202 estimated as described above, it is possible to generate an image (virtual viewpoint image) of the object 202 from an arbitrary virtual viewpoint. This virtual viewpoint may be set by a user, or may be automatically set according to a predetermined rule. For instance, an image generation unit (not illustrated) included in the image processing apparatus 100 may use information indicating a location and a visual field of a set virtual viewpoint to determine a three-dimensional location of the object 202 to be captured on each pixel of a virtual viewpoint image. Additionally, this image generation unit may refer to position and orientation information of a plurality of the image capturing apparatuses 203, to determine a color in a three dimensional location of the object 202, from each of the images captured by the plurality of image capturing apparatuses 203. Accordingly, the image generation unit may determine a color of each pixel of the virtual viewpoint image, that is, generating a virtual viewpoint image. Additionally, the image generation unit may also generate a virtual viewpoint movie configured with the above-described virtual viewpoint image.

A system for generating the above virtual viewpoint movie may determine the three-dimensional location and shape of the object 202 with high accuracy even under an illumination apparatus, since a configuration according to the above-described embodiments is included, and thus the system may generate a high quality virtual viewpoint movie based on this determination result. Accordingly, it is possible to enhance quality of a virtual viewpoint movie of an object in an indoor event held in a studio, an indoor stadium, or the like. Additionally, it is also possible to enhance quality of a virtual viewpoint movie of an object in an outdoor event under an environment that is irradiated with illumination such as a night game of baseball.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-254397, filed Dec. 28, 2017, which is hereby incorporated by reference herein in its entirety.

What is claimed is:

1. An image processing apparatus, comprising:
one or more memories storing instructions; and
one or more processors that execute the instructions to:
obtain a movie including a plurality of frame images for a predetermined imaging range, the plurality of frame images including a target image including an object, wherein brightness of the plurality of frame images included in the movie varies at a cycle;
specify brightness of the obtained target image;
specify the cycle at which the brightness of the plurality of frame images included in the movie varies;
select an image from the obtained plurality of frame images based on the specified cycle and a similarity between a feature reflecting brightness of the target image and a feature reflecting brightness of an image that is included in the plurality of frame images and is different from the target image;
obtain a background image using the selected image, wherein the similarity of the feature reflecting brightness of the selected image to the feature reflecting brightness of the target image is not smaller than a threshold value; and
determine a region of the object in the target image based on the background image.

2. The image processing apparatus according to claim 1, wherein the feature reflecting brightness is pixel value distribution in an image, or spatial frequency distribution in an image.

3. The image processing apparatus according to claim 1, wherein a first frame image and a second frame image are selected from the plurality of frame images as the selected image, and the plurality of frame images includes one or more unselected frame images between the first frame image and the second frame image.

4. The image processing apparatus according to claim 1, wherein the movie contains flicker, and brightness of the movie varies at the cycle due to the flicker.

5. The image processing apparatus according to claim 1, wherein the cycle is specified based on the feature reflecting brightness of the frame image.

6. The image processing apparatus according to claim 5, wherein the cycle is determined through a frequency analysis on the feature reflecting brightness of the frame image in a time direction.

7. The image processing apparatus according to claim 1, wherein the image is selected, based on the feature reflecting brightness of the target image, from frame images including a third frame image away from the target image in a time direction by a multiple of the cycle and frame images continuous with the third frame image in a time direction.

8. The image processing apparatus according to claim 1, wherein
the movie is obtained by each of a plurality of image capturing apparatuses, and
the one or more processors further execute the instructions to verify a determination result of the cycle for a movie obtained by a first image capturing apparatus, in view of a determination result of the cycle for a movie obtained by a second image capturing apparatus.

9. The image processing apparatus according to claim 1, wherein the one or more processors further execute the instructions to:
- determine whether a brightness variation amount of the movie in a time direction exceeds a threshold value or not; and
- obtain a background image, which is obtained using an image selected from the plurality of frame images independently of brightness of the target image, and
- wherein, in response to the variation amount exceeding a threshold value, the region of the object is determined based on the background image obtained using the image selected based on the specified brightness of the target image and the specified cycle, and, in response to the variation amount not exceeding the threshold value, the region of the object is determined based on the background image obtained using the image selected independently of brightness of the target image.

10. The image processing apparatus according to claim 1, wherein
- the background image is obtained by processing the selected image with an intermediate value filter, and
- the region of the object is determined based on calculating a difference between the target image and the background image.

11. The image processing apparatus according to claim 1, wherein
- regions of the object in target images captured by a plurality of image capturing apparatuses are determined, and
- the one or more processors further execute the instructions to estimate a three-dimensional location and shape of the object based on the determined regions of the object.

12. The image processing apparatus according to claim 1, wherein,
- selecting the image from the obtained plurality of frame images comprises:
  - a first selection to select one or more images from the plurality of frame images based on the specified cycle; and
  - a second selection to select an image from the one or more images selected in the first selection based on the specified cycle, based on a similarity between the feature reflecting brightness of the target image and features reflecting brightness of the one or more images selected in the first selection.

13. The image processing apparatus according to claim 12, wherein,
- all of the one or more images, selected in the first selection based on the specified cycle, are selected in the second selection, in response to determining that similarities of any of the features reflecting brightness of the one or more images selected in the first selection to the feature reflecting brightness of the target image is not smaller than the threshold.

14. An image processing method, comprising:
- obtaining a movie including a plurality of frame images for a predetermined imaging range, the plurality of frame images including a target image including an object, wherein brightness of the plurality of frame images included in the movie varies at a cycle;
- specifying brightness of the obtained target image;
- specifying the cycle at which the brightness of the plurality of frame images included in the movie varies;
- selecting an image from the obtained plurality of frame images based on the specified cycle and a similarity between a feature reflecting brightness of the target image and a feature reflecting brightness of an image that is included in the plurality of frame images and is different from the target image;
- obtaining a background image using the selected image, wherein the similarity of the feature reflecting brightness of the selected image to the feature reflecting brightness of the target image is not smaller than a threshold value; and
- determining a region of the object in the target image based on the background image.

15. A non-transitory computer-readable medium storing a program including instructions which, when the program is executed by a computer, cause the computer to perform:
- obtaining a movie including a plurality of frame images for a predetermined imaging range, the plurality of frame images including a target image including an object, wherein brightness of the plurality of frame images included in the movie varies at a cycle;
- specifying brightness of the obtained target image;
- specifying the cycle at which the brightness of the plurality of frame images included in the movie varies;
- selecting an image from the obtained plurality of frame images based on the specified cycle and a similarity between a feature reflecting brightness of the target image and a feature reflecting brightness of an image that is included in the plurality of frame images and is different from the target image;
- obtaining a background image using the selected image, wherein the similarity of the feature reflecting brightness of the selected image to the feature reflecting brightness of the target image is not smaller than a threshold value; and
- determining a region of the object in the target image based on the background image.

* * * * *